US012812291B2

(12) United States Patent
Robison et al.

(10) Patent No.: US 12,812,291 B2
(45) Date of Patent: Nov. 24, 2026

(54) DYNAMIC VALVE FOR ENABLING MULTIPLE SPEAKER MODES

(71) Applicant: Apple Inc., Cupertino, CA (US)

(72) Inventors: David W. Robison, San Jose, CA (US); Teemu P. Sipila, Campbell, CA (US); Rebecca J. Russell, Cupertino, CA (US); Onur I. Ilkorur, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 19/038,222

(22) Filed: Jan. 27, 2025

(65) Prior Publication Data

US 2025/0330744 A1 Oct. 23, 2025

Related U.S. Application Data

(60) Provisional application No. 63/637,773, filed on Apr. 23, 2024.

(51) Int. Cl.

| | |
|---|---|
| ***H04R 1/28*** | (2006.01) |
| ***H04R 1/24*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............. *H04R 1/2849* (2013.01); *H04R 1/24* (2013.01); *H04R 9/025* (2013.01); *H04R 9/045* (2013.01); *H04R 9/06* (2013.01)

(58) Field of Classification Search
CPC ........ H04R 1/2849; H04R 1/24; H04R 9/025; H04R 9/045; H04R 9/06; H04R 1/2846; H04R 1/2811; H04R 2499/11; H04R 2400/11; H04R 9/02
See application file for complete search history.

(56) References Cited

U.S. PATENT DOCUMENTS

| | | | | |
|---|---|---|---|---|
| 7,478,702 | B2 * | 1/2009 | Berg ...................... | B33Y 80/00 381/328 |
| 9,621,979 | B2 * | 4/2017 | Bakalos ............... | H04R 1/1041 |
| 9,706,290 | B2 | 7/2017 | Grinker | |
| 10,469,940 | B2 * | 11/2019 | Taylor .................. | H04R 1/2826 |
| 10,687,153 | B2 * | 6/2020 | Albahri ................ | H04R 25/405 |
| 10,932,070 | B2 * | 2/2021 | Chmielewski ....... | H04R 1/1016 |
| 11,102,576 | B2 | 8/2021 | Miller et al. | |

(Continued)

FOREIGN PATENT DOCUMENTS

| | | | | |
|---|---|---|---|---|
| CN | 203708471 U | * | 7/2014 | ............... H04R 9/06 |

*Primary Examiner* — Oyesola C Ojo
(74) *Attorney, Agent, or Firm* — Aikin & Gallant, LLP

(57) ABSTRACT

A transducer assembly comprising: an enclosure having an enclosure wall that defines a sound output port from an interior chamber of the enclosure; a sound radiating surface having a voice coil coupled thereto and dividing the interior chamber into a front volume chamber coupling a first side of the sound radiating surface to the sound output port and a back volume chamber coupled to a second side of the sound radiating surface; a magnet assembly having a magnet coupled to a yoke that defines in part the back volume chamber and an acoustic port from the back volume chamber; and a valve coupled to the acoustic port to close or open the acoustic port depending on whether the transducer assembly is in a distress mode or a non-distress mode.

19 Claims, 3 Drawing Sheets

(56) References Cited

U.S. PATENT DOCUMENTS

| | | | | |
|---|---|---|---|---|
| 11,245,973 | B2 * | 2/2022 | Hansen | H04R 1/1016 |
| 2014/0169579 | A1 * | 6/2014 | Azmi | H04R 1/1083<br>381/71.6 |
| 2014/0169585 | A1 * | 6/2014 | Howes | H04R 1/086<br>381/91 |
| 2014/0169603 | A1 * | 6/2014 | Sacha | H04R 25/652<br>381/324 |
| 2016/0255433 | A1 * | 9/2016 | Grinker | H04R 1/1016<br>381/380 |
| 2018/0091892 | A1 * | 3/2018 | Taylor | H04R 1/2826 |
| 2019/0208301 | A1 * | 7/2019 | Monti | H04R 1/1016 |
| 2022/0103934 | A1 * | 3/2022 | Ilkorur | H04R 9/06 |
| 2022/0312108 | A1 * | 9/2022 | Zhang | H04R 1/1016 |
| 2023/0276178 | A1 * | 8/2023 | Zhang | H04R 1/2811<br>381/151 |
| 2024/0056728 | A1 * | 2/2024 | Hui | H04R 1/2826 |

* cited by examiner

DYNAMIC VALVE FOR ENABLING MULTIPLE SPEAKER MODES

CROSS-REFERENCE TO RELATED APPLICATION

This application is a non-provisional application of co-pending U.S. Provisional Patent Application No. 63/637,773, filed April 23 2024, and incorporated herein by reference.

FIELD

An aspect of the disclosure is directed to a dynamic valve assembly for enabling multi speaker functionality. Other aspects are also described and claimed.

BACKGROUND

Portable communications or listening devices (e.g., smart phones, earphones, etc.) have within them one or more transducers that convert an input electrical audio signal into a sound pressure wave output that can be heard by the user, or a sound pressure wave input into an electrical audio signal. The transducer (e.g., a speaker) can be used to, for example, output sound pressure waves corresponding to the voice of a far end user, such as during a telephone call, to output sound pressure waves corresponding to sounds associated with a game or music the user wishes to play, or in some cases a high-pitched distress to alert people nearby of an emergency. Due to the relatively low profile of the portable devices, the transducers also have a relatively low profile, which in turn, can make it difficult to maintain optimal sound quality.

SUMMARY

An aspect of the disclosure is directed to a dynamic valve that can be used to control the opening, closing or partial opening/closing of a port between a speaker cavity and an enclosure cavity or ambient to allow a transducer assembly (e.g., a speaker) to operate in at least two different modes, and in some cases more than two modes or multiple modes. Representatively, in some aspects, an electronic device may include a primary speaker and a secondary speaker that can utilize the mechanical and front port resonances in unison to produce a dual-tone asset for maximum salience in a distress mode and/or a non-distress mode. The primary and secondary speakers may also be used together for all media and telephony use-cases (e.g., a non-distress mode) while also utilizing the highly efficient (low-distortion) secondary speaker to improve intelligibility and increase loudness in the distress mode. For example, the secondary speaker may be used in a distress mode to produce a high-pitched sound to alert people nearby. For example, the sound produced in the distress mode may include a sound having one or more frequencies that rise and fall over time, a Morse code distress signal, one or more tones that are emitted at frequencies corresponding to one or more resonant frequencies of the electronic device (e.g., to enhance loudness and reduce power consumption), and/or one or more chirps (which may also be referred to as pings, ticks, beeps, blips, or the like). Representatively, a chirp may be a burst of sound that is separated in time from one or more adjacent bursts of sound. In various use cases, between the chirps, no sound may be emitted by the electronic device, background (e.g., white) noise may be emitted by the electronic device, or one or more different chirps, pings, ticks, beeps, blips, or the like may be emitted.

The quality and/or loudness of the sound produced can be further improved by using a valve to dynamically open and/or close at least one of the speaker ports based on whether the speaker(s) is in a distress mode or a non-distress mode. In still further aspects, it is contemplated that the dynamic valve may further be used to allow a single full range speaker to operate in the two different modes, namely a distress mode (valve closed) and media/telephony mode (valve open). In some aspects, the transducer or speaker assembly may have a port from a back volume that is open or sealed by a valve, and a smaller controlled equalization port or vent from the back volume that is covered with a tuned acoustic mesh. The ports may be formed through the speaker assembly yoke and connect the back volume of the speaker to a surrounding system volume, or in some cases a surrounding environment, when the valve is open. The valve may be considered open for all use cases or applications except for when the assembly is in the distress mode and high SPL resonance is required. In other words, the valve may in some aspects be closed only when the distress mode feature is initiated. In some aspects, the sizes and shapes of the ports and/or an acoustic impedance of a mesh covering the ports may be tuned to increase air flow and/or excursion and output of the associated speaker assembly. For example, in some aspects, the port diameter may be reduced and/or the acoustic impedance of the mesh may be increased to increase maximum SPL peak when the valve is closed (e.g., to simulate a truly sealed back volume). In some aspects, this configuration may be coupled with resonance tracking and a synthesizer to maximize distress loudness when the valve is closed by updating the synthesizer frequencies periodically or in real-time. In still further aspects, digital signal processing (DSP) parameters may be updated accordingly depending on if the valve is open or closed. In other aspects, a single port and valve configuration may be used, and the valve may include a micro leak to ensure the speaker always has an equalization path even when the valve is closed. The port diameter could be increased and/or the mesh acoustic impedance reduced for reduced flow resistance. In still further aspects, multiple ports for minimum flow resistance and balanced pressure flow may be used.

Representatively, in some aspects, a transducer assembly may include an enclosure having an enclosure wall that defines a sound output port from an interior chamber of the enclosure; a sound radiating surface having a voice coil coupled thereto and dividing the interior chamber into a front volume chamber coupling a first side of the sound radiating surface to the sound output port and a back volume chamber coupled to a second side of the sound radiating surface; a magnet assembly having a magnet coupled to a yoke that defines in part the back volume chamber and an acoustic port from the back volume chamber; and a valve coupled to the acoustic port to close or open the acoustic port depending on whether the transducer assembly is in a distress mode or a non-distress mode. In some aspects, the acoustic port is from the back volume chamber to an exterior chamber surrounding the enclosure. In other aspects, the valve closes the acoustic port in the distress mode. In still further aspects, in the distress mode the sound radiating surface outputs a sound within a frequency range of from about 2.5 kilohertz to about 5 kilohertz. In other aspects, the valve opens the acoustic port in the non-distress mode. In some aspects, in the non-distress mode the sound radiating surface outputs a sound within a broadband frequency range of from about 100 hertz to about 10 kilohertz. In some aspects, the yoke further defines a passive pressure equalization port from the back volume chamber. In some aspects, the acoustic port is a first acoustic port and the valve is a first valve, and the transducer assembly further comprises a second acoustic port and a second valve coupled to the second acoustic port to close or open the second acoustic port depending on whether the transducer assembly is in the distress mode or the non-distress mode. In other aspects, the valve includes a micro leak that opens the back volume chamber to an exterior chamber surrounding the enclosure when the valve closes the acoustic port. In some aspects, the sound radiating surface, the voice coil and the magnet comprise a first sound radiating surface, a first voice coil and a first magnet, and the transducer assembly further comprises a second sound radiating surface, a second voice coil and a second magnet, and the first sound radiating surface produces sound in the non-distress mode and the second sound radiating surface produces sound in the distress mode. In some aspects, the transducer assembly is a speaker.

In another aspect, a portable electronic device includes an enclosure having an enclosure wall that forms an interior chamber and a sound output port to an ambient environment; a transducer assembly positioned within the interior chamber and dividing the interior chamber into a front volume chamber coupling a sound output side of the transducer assembly to the sound output port and a back volume chamber coupling another side of the transducer to an acoustic port from the back volume chamber; and a valve coupled to the acoustic port to close or open the acoustic port depending on whether the transducer assembly is in a distress mode or a non-distress mode. In some aspects, the acoustic port is from the back volume chamber to a portion of the interior chamber surrounding the transducer assembly. In still further aspects, the valve closes the acoustic port in the distress mode. In some aspects, in the distress mode the transducer assembly outputs a sound within a broadband frequency range of from about 2.5 kilohertz to about 3.5 kilohertz. In other aspects, the valve opens the acoustic port in the non-distress mode. In some aspects, in the non-distress mode the transducer assembly outputs a sound within a frequency range of from about 100 hertz to about 10 kilohertz. The yoke may further define a passive pressure equalization port from the back volume chamber. In some aspects, the acoustic port is a first acoustic port and the valve is a first valve, and the transducer assembly further comprises a second acoustic port and a second valve coupled to the second acoustic port to close or open the second acoustic port depending on whether the transducer assembly is in the distress mode or the non-distress mode. The valve may include a micro leak that opens the back volume chamber to a portion of the interior chamber surrounding the transducer assembly when the valve closes the acoustic port. In some aspects, the transducer assembly may include a sound radiating surface having a voice coil coupled thereto and the sound output side of the sound radiating surface is coupled to the sound output port and the another side of the sound radiating surface is coupled to the back volume chamber, and a magnet assembly having a magnet coupled to a yoke that defines in part the back volume chamber and the acoustic port from the back volume chamber. The transducer assembly may be a first transducer assembly, and the electronic device further comprises a second transducer assembly, and the first transducer assembly produces sound in the non-distress mode and the second transducer assembly produces sound in the distress mode.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms “a”, “an”, and “the” are intended to include the plural forms as well, unless the context indicates otherwise. It will be further understood that the terms “comprises” and/or “comprising” specify the presence of stated features, steps, operations, elements, and/or components, but do not preclude the presence or addition of one or more other features, steps, operations, elements, components, and/or groups thereof.

The terms “or” and “and/or” as used herein are to be interpreted as inclusive or meaning any one or any combination. Therefore, “A, B or C” or “A, B and/or C” mean “any of the following: A; B; C; A and B; A and C; B and C; A, B and C.” An exception to this definition will occur only when a combination of elements, functions, steps or acts are in some way inherently mutually exclusive.

Figure 1:
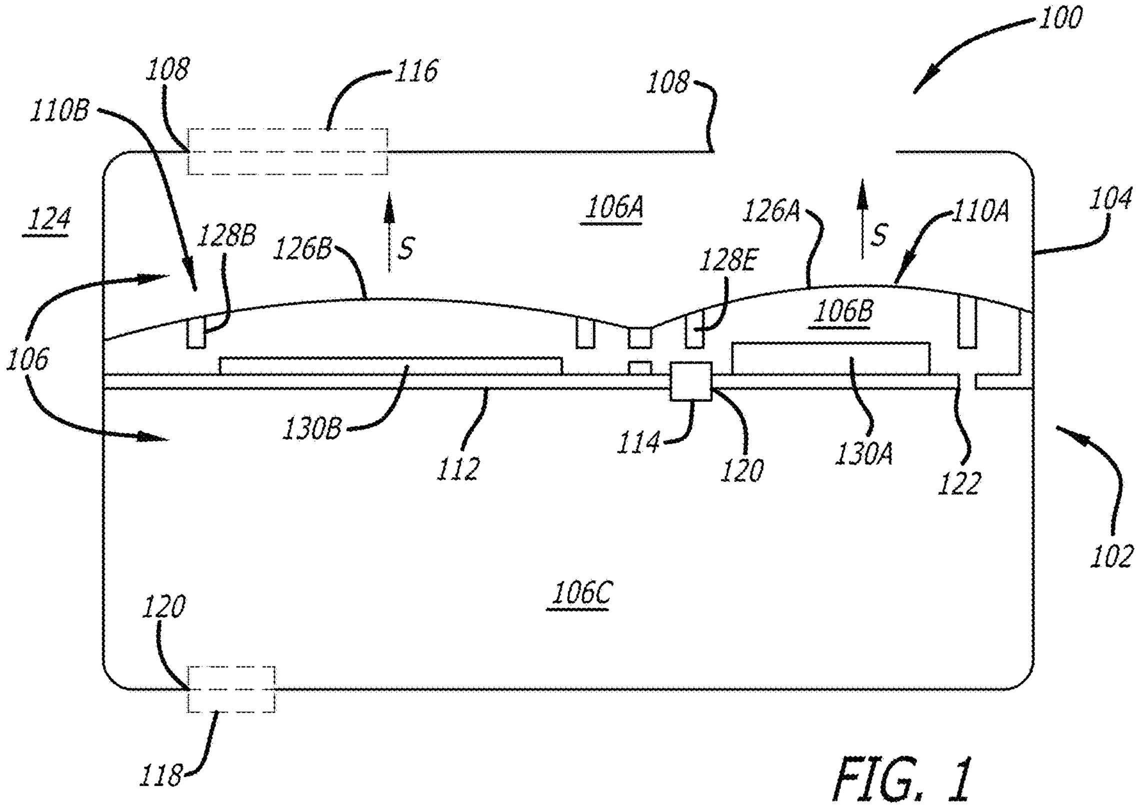
FIG. 1 illustrates a cross-sectional side view of one aspect of a portable electronic device and/or transducer assembly having a valve.

FIG. 1 illustrates a cross-sectional side view of one aspect of a portable electronic device and/or transducer assembly having a valve. The device or assembly 100 may include a housing, casing or outer enclosure 102 that defines or closes off an interior volume or chamber in which the constituent electronic components of device or assembly 100 are contained and/or enclosed from the surrounding environment 124. In some aspects, surrounding environment 124 may be the exterior, external or ambient environment. In some aspects, it is contemplated that device or assembly 100 may be a portable time piece, a portable or mobile communications device, an in-ear device, or any other device within which a transducer or sensor having a valve may be implemented. In other aspects, device or assembly 100 may be a module or unit including the transducer assembly components that can be integrated within an electronic device. Enclosure 102 may include an enclosure wall 104 that separates surrounding environment 124 from an encased space or interior chamber 106 formed within enclosure 102. In some cases, the enclosure wall 104 completely isolates or seals the entire, or a portion of, interior chamber 106 from the surrounding environment 124. For example, enclosure wall 104 may form a waterproof or acoustically isolated portion of interior chamber 106 which is impermeable to water and/or air. The interior chamber 106 may be of a sufficient volume and/or size to accommodate the constituent components of device or assembly 100. The enclosure wall 104 may also include one or more of an acoustic port 108. The acoustic ports 108 may be, for example, sound output ports through which sound generated by a sound radiating surface (e.g., a speaker assembly) positioned within interior chamber 106 may be output. In other aspects, where a microphone is positioned near enclosure acoustic ports 108, they could be a sound input port to allow for input of sound to the microphone.

Representatively, in one aspect shown in FIG. 1, enclosure acoustic ports 108 are acoustically open to transducers 110A and 110B positioned within interior chamber 106. In some aspects, transducers 110A-B may be any type of electroacoustic transducer capable of converting an electrical audio signal into a sound or a sound into an electrical audio signal. Representatively, each of transducers 110A-B may be a speaker or a micro-speaker, for example, a miniaturized version of a loudspeaker that uses a moving coil motor to drive sound output. Thus, in some aspects, transducers 110A-B may be referred to herein as micro-speakers. In other aspects, where the transducers convert sound into an electrical audio signal, they may further be referred to herein as microphones. In aspects where transducers 110A-B are speakers, they may be the same or different speakers that generate or output different types of sounds. Representatively, in some aspects, transducer 110B may be a primary speaker which generates and/or outputs sounds in a broadband frequency range (e.g., from about 100 hertz to about 10 kilohertz) during a normal use or non-distress mode of the device, for example, telephony, ringtones, music play back, Siri, etc. Transducer 110A, on the other hand, may be a secondary speaker (e.g., a tweeter) which generates and/or outputs high-pitched sounds (e.g., from about 2.5 kilohertz to about 5 kilohertz) that can be heard several feet away (e.g., >300 feet) during a distress or emergency use mode of the device. In this aspect, assembly or device 100 may be considered to have a dual or multi speaker functionality in that it can output sounds in both a normal or non-distress mode and a distress mode of the device.

Referring now in more detail to transducers 110A-B, each of transducers 110A-B may include a sound radiating surface or diaphragm 126A-B and a voice coil 128A-B that causes a respective diaphragm 126A-B to vibrate to output sound (S) as illustrated by the arrows. The top side or surface of diaphragm 126A-B shares a chamber or acoustic volume 106A with acoustic ports 108 such that the sound (S) may be output through acoustic ports 108. In this aspect, chamber or acoustic volume 106A may be considered a front volume chamber. Each of the sound radiating surface or diaphragm 126A-B and voice coil 128A-B are suspended over a magnet assembly 130A-B coupled to a yoke 112. The magnet assembly 130A-B may include a permanent magnet that along with the yoke 112 define a magnetic gap within which voice coil 128A-B may be positioned. When a current passes through voice coil 128A-B, it generates a magnetic field that interacts with the magnet's field causing the voice coil 128A-B, and in turn diaphragm 126A-B to vibrate and produce sound (S). Sound (S) may be output through acoustic ports 108 as previously discussed. It may further be understood that the sound output side of both diaphragms 126A-B are connected to front volume 106A and therefore share the acoustic ports 108. It should further be understood that in some aspects, one of the acoustic ports 108, for example the port above speaker 110B, may have multiple openings, thus the bulk of the pressure output may be through the port with multiple openings. In addition, the mechanical resonance and front port resonance may be used to increase loudness of one or more of transducers 110A-B in the distress mode.

Representatively, back or bottom side or surface of diaphragm 126A-B may be considered to define a further acoustic volume or chamber 106A within enclosure 102 that is isolated or separated from acoustic ports 108 and the front chamber or volume 106A. In some aspects, volume or chamber 106B coupled to the back or bottom side of diaphragm 126A-B may be considered to be a back volume chamber. In addition, back volume chamber 106B may further be separated by yoke 112 from a further enclosure or system volume 106C defined by the enclosure wall 104. For example, diaphragms 126A-B may be suspended from support members connected to the yoke 112 to define back volume 106B. Yoke 112 may further be connected to the enclosure wall 104 such that a bottom side of yoke 112 along with enclosure wall 104 define the system volume 106C. When back chamber or volume 106B is sealed or isolated from chambers 106A and 106C, the transducer can take advantage of mechanical resonance and front port resonance to increase loudness in the distress mode. In some aspects, however, it may further be desirable for back volume chamber 106B to be open to the enclosure or system volume 106C (e.g., non-distress mode). Thus, in some aspects, a port 120 may further be formed through yoke 112, between back volume chamber 106B and system volume 106C, and a valve 114 may be coupled to port 120 to open/close the port. In still further aspects, a vent 122 may also be formed through yoke 112 to provide controlled leak for pressure equalization between chamber 106B and system volume 106C. In some aspects, vent 122 may include an acoustic or tuned mesh to control the leak between chamber 106B and volume 106C. In addition, in some aspects, a size of vent 122 may be tuned to achieve a desired acoustic output. For example, a size of the vent 122 may be decreased to increase a loudness or maximum SPL in the distress mode. In still further aspects, it is contemplated that vent 122 may be optional, and in some aspects, may be omitted such that the only opening between chambers 106B and 106C is port 120.

Referring now in more detail to the valve operation, as previously discussed, in some aspects, transducers 110A-B may be used to provide dual or multi speaker functionality. For example, assembly or device 100 may operate in a normal or non-distress mode in which sound is output from transducer 110B in a broadband frequency range for telephony, music play back, Siri, etc. For example, in the non-distress mode one or more of transducers 110A-B may output a sound in a frequency range of from about 100 hertz to about 10 kilohertz. In other aspects, device 100 may operate in a distress mode in which transducer 110A operates like a tweeter and outputs high frequency sounds that can be heard several feet away. For example, in the distress mode, one or more of transducers 110A-B may output a sound in a frequency range of from about 2.5 kilohertz to about 3.5 kilohertz, or up to about 5 kilohertz. In the non-distress mode (e.g., telephony and/or media applications), it is desirable to have a reduced flow resistance and for the diaphragm 126B to move more freely as this improves broadband linearity and reducing non-linear distortion. Thus, in the non-distress mode, valve 114 may transition to an open configuration in which it does not cover port 120 and port 120 is open to system volume 106C. In the distress mode, however, it is desirable for back volume chamber 106B to be sealed or otherwise closed off from system volume 106C to achieve high SPL output (e.g., >80 dB) and maximize the distress output. In some aspects, valve 114 may be an active valve that receives a signal or voltage to open/close port 120 depending on whether the device 100 is in a distress or non-distress mode. For example, in some aspects, when device 100 is determined to be in a distress mode, the system sends a signal or voltage to close valve 114. Valve 114 may remain closed until a different mode is detected. Once a non-distress mode is detected, another signal or voltage may be transmitted to open valve 114. In other aspects, it is contemplated that valve 114 could be a passive valve. For example, valve 114 could be a pressure sensitive valve that opens/closes based on a pressure on the valve. Representatively, the pressure in chamber 106B corresponding to the frequency range output in the distress and non-distress modes may be known. Thus, valve 114 may be tuned to open in response to a pressure threshold corresponding to the non-distress mode, and close in response to a pressure threshold corresponding to a distress mode. Valve 114 may be any type of valve suitable for operating as disclosed herein. For example, valve 114 may include, but is not limited to, a solenoid, a shape memory alloy, an electrostatic, a piezoelectric flap valve, or the like.

In addition, it is further contemplated that in some aspects, valves 116, 118 may further be provided to open or close ports between the enclosure volume 106 and ambient, exterior or surrounding environment 124. For example, a valve 116 may be coupled to the port 108 that is formed in enclosure wall 104 over transducer 110B. In this aspect, valve 116 may transition to an open configuration and be used to open port 108 so that front volume chamber 106A is more open to the surrounding or ambient environment 124. In other aspects, valve 116 may transition to a closed configuration and be used to close port 108 so that front volume chamber 106A is less open to the surrounding or ambient environment 124. In still further aspects, valve 118 may be coupled to the port 120 between system volume or chamber 106C and the surrounding or ambient environment 124. In this aspect, valve 118 may be used to connect or seal off system volume or chamber 106C and surrounding or ambient environment 124 from one another depending on the desired acoustic output. It is recognized that, for example, a size, volume, pressure or other aspects of front volume chamber 106A or back volume chamber 106B may impact the acoustic performance of transducers 110A-B. Thus, modifying the size, volume and/or pressure of front volume chamber 106A and/or back volume chamber 106B may be used to further tune the acoustic performance of transducers 110A-B. For example, in some cases, it may be desirable for front volume chamber 106A and/or back volume chamber 106B to be isolated or sealed (e.g., high impedance) from the ambient environment 124 to achieve the desired acoustic performance. In other cases, it may be desirable for front volume chamber 106A and/or back volume chamber 106B to have a very open path (e.g., low impedance) and have some amount of leak to the surrounding ambient environment 124. Thus, one or more of optional valves 116, 118 coupled to ports 108, 120 are contemplated.

Figure 2:
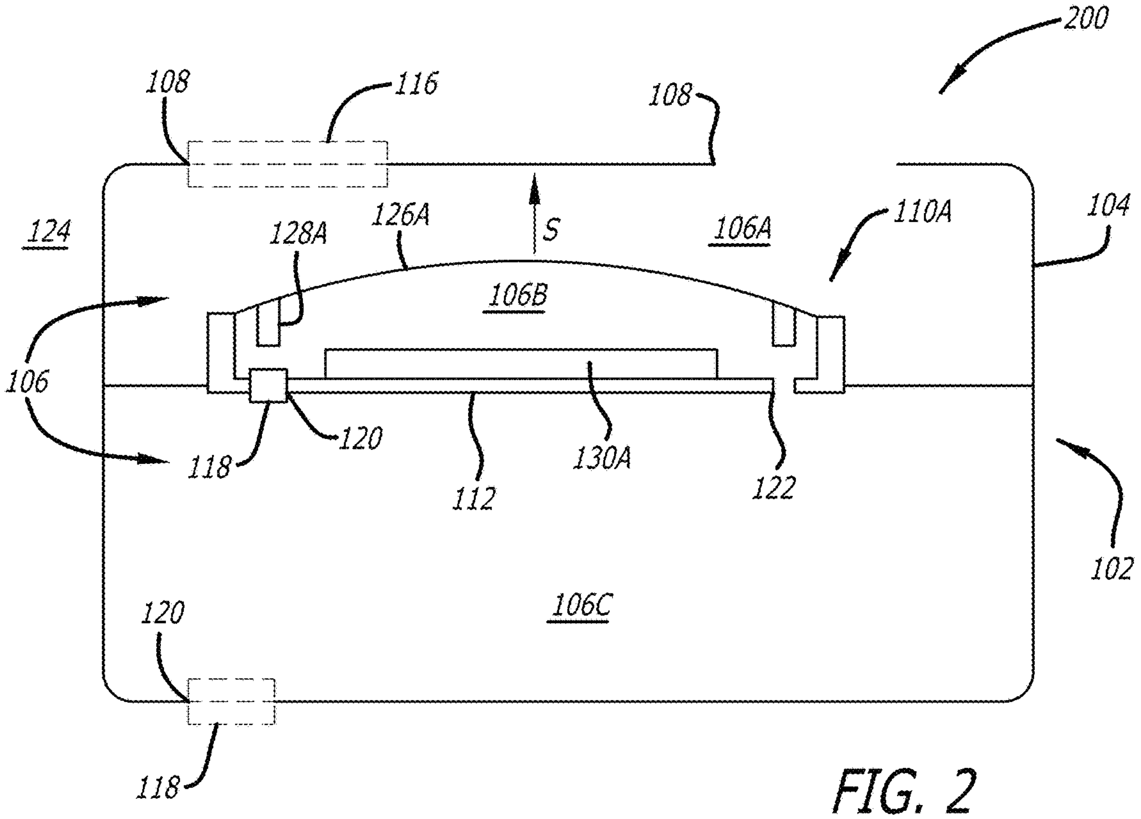
FIG. 2 illustrates a cross-sectional side view of another aspect of a portable electronic device and/or transducer assembly having a valve.

Referring now to FIG. 2, FIG. 2 illustrates a cross-sectional side view of another aspect of a portable electronic device and/or transducer assembly having a valve. Device and/or transducer assembly 200 may be the same as the previously discussed device and/or transducer assembly 100 with the exception that in this configuration, transducer 110B is omitted. In this aspect, the single transducer 110A provides dual or multi speaker functionality in both the distress and non-distress modes as previously discussed. Transducer 110A may be a full range, sealed back volume driver that includes all of the same components as previously discussed in reference to FIG. 1 thus a detailed description of each of these components will not be repeated in reference to FIG. 2. In addition, as previously discussed, device and/or transducer assembly 200 may include a valve 118 coupled to a port 120 formed through yoke 112 to couple the back volume 106B to system volume 106C, and an optional vent 122. The valve 118 may be used to open or close port 120 to the surrounding system volume 106C depending on whether device or transducer assembly 200 is in a distress or non-distress mode as previously discussed. Representatively, in some aspects, when device 100 is determined to be in a distress mode (e.g. transducer 110A is outputting a high frequency distress sound), the system sends a signal or voltage to close valve 114. Valve 114 may remain closed until a different mode is detected. Once a non-distress mode is detected, another signal or voltage may be transmitted to open valve 114. In other aspects, it is contemplated that valve 114 may be a passive valve that is tuned to open in response to a pressure threshold corresponding to the non-distress mode, and close in response to a pressure threshold corresponding to a distress mode. Valve 114 may be any type of valve suitable for operating as disclosed herein. For example, valve 114 may include, but is not limited to, a solenoid, a shape memory alloy, an electrostatic, a piezoelectric flap valve, or the like.

It may further be understood that in some aspects, the distress and non-distress modes may be determined by the acoustic architecture. For example, in the single-speaker architecture of FIG. 2, the transducer assembly 200 is in a normal or non-distress mode (e.g., telephony, ringtones, Siri, etc.) when the valve 114 is open such that the back volume chamber 106B is open to the system volume 106C and transducer 110A is outputting sound within a broadband frequency range of 100 hertz to 10 kilohertz. On the other hand, transducer assembly 200 is in a distress mode when valve 114 is closed such that back volume chamber 106B is closed to system volume 106C and transducer 110A is outputting sound within an estimated F0->2.5-3 kilohertz range, for example up to 5 kilohertz. Alternatively, in the dual-speaker architecture of FIG. 1, the transducer assembly 100 is in a normal or non-distress mode when the valve 114 is open such that back volume chamber 106B is open to system volume 106C and one or more of transducers 110A-B have an extended low-frequency extension with F0=~2 kilohertz. On the other hand, transducer assembly 200 is in a distress mode when valve 114 is closed such that back volume chamber 106B is closed to system volume 106C and transducer 110A is outputting sound within an estimated F0=3.15 kilohertz range. It may further be understood that at far distances (>300 feet), dual-tone sound outputs are more perceivable than single-tone outputs. In this aspect, it may be understood that two resonances improve the distress's effectiveness/salience. Even one loud resonance in the 2.5-5 kHz frequency range, however, can still be audible~300-600 ft. Incorporating the valve 114 to close the port and seal the back chamber in the distress mode can help to achieve higher perceived loudness, or a louder distress mode even with a single speaker architecture.

In still further aspects, there may be an "in-between" mode, in which valve 114 is partially closed, or partially covers port 120. For example, in the case of an alarm, it may not be necessary for the sound to be heard 600 ft away (e.g., distress mode), but rather, a strong, efficient tone located in the midrange ~1-2 kHz may be desired. In this aspect, valve 114 may be partially closed and FO increases to a desirable frequency range to produce a desired midrange SPL output (e.g., ~1-2 kHz). In still further aspects, if more than one valve is utilized, individually tuned flow resistances per valve are contemplated. Depending on which valve is closed, there may be different resonance frequencies. On the other hand, when valve 114 is completely closed, and transducer is in the distress mode, F0 increases dramatically from 800 Hz to 2.6 kHz, producing high SPL at ~2.6 kHz, as previously discussed.

Figure 3:
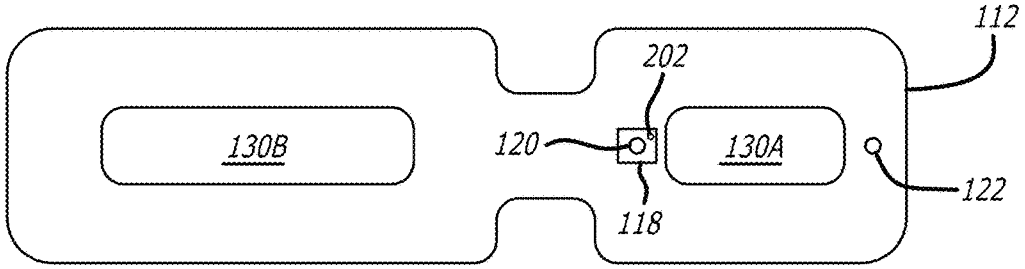
FIG. 3 illustrates a top plan view of some aspects of the portable electronic device and/or transducer assembly having a valve of FIG. 1.

Referring now to FIG. 3, FIG. 3 illustrates a top plan view of some aspects of the portable electronic device and/or transducer assembly having a valve of FIG. 1. Representatively, FIG. 3 illustrates a top plan view of the yoke 112 and magnet assemblies 130A-B, with the remaining transducer components omitted so that the arrangement of port 120 and valve 118, along with vent 122, can be more clearly understood. In particular, from this view it can be understood that port 120 may be formed through a portion of yoke 112 between magnet assemblies 130A and 130B. In some aspects, port 120 may be formed through a portion of yoke 112 closer to magnet assembly 130A than magnet assembly 130B. Valve 118 may be positioned at port 120 so that it can be used to open or close port 120. Representatively, in some aspects, valve 118 may include a flap or other moving member that is attached to yoke 112 and is operable to move between open and closed positions to open and close port 120. In addition, in some aspects, it is contemplated that valve 118 may include a micro hole, pore or opening 202 such that even when valve 118 is in the closed position and covering port 120, a small amount of leak through port 120 is possible. Micro hole, pore or opening 202 may ensure that the speaker always has an equalization path. In addition, it can be seen from this view that vent 122 may be formed through a portion of yoke 112 along the other side of magnet assembly 130A. Vent 122, however, may be optional and in some aspects may be omitted. For example, in aspects where valve 118 includes a micro hole, pore or opening 202 vent 122 may be omitted. Moreover, in some aspects, the pore diameter could be increased and/or the acoustic impedance of a mesh associated with one or more of the ports or openings could be reduced for reduced flow resistance. In addition, it is contemplated that although opening 120 and vent 122 are shown in this configuration along opposite sides of magnet assembly 130A, they may be formed within other portions of yoke 112 surrounding magnet assembly 130A. In addition, although magnet assembly 130B corresponding to a second transducer 110B is also shown in FIG. 3, the second transducer 110B may be omitted as previously discussed and magnet assembly 130B also omitted from FIG. 3.

Figure 4:
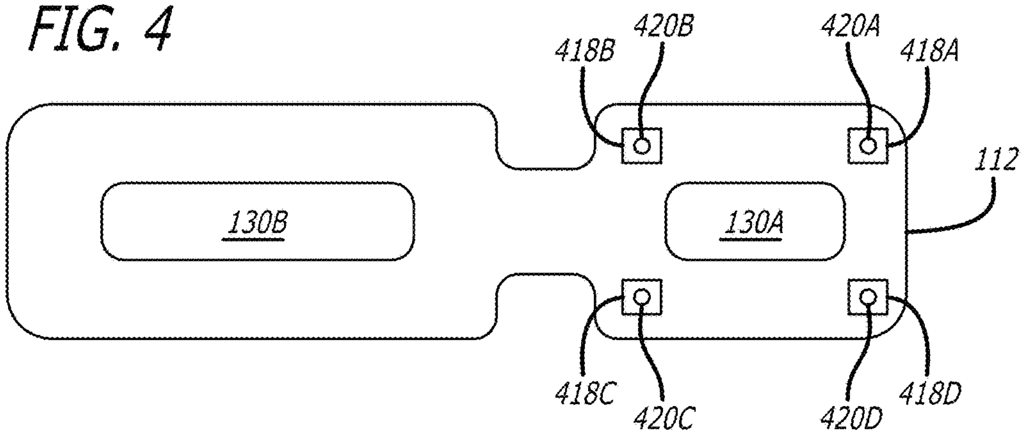
FIG. 4 illustrates a top plan view of some aspects of the portable electronic device and/or transducer assembly having a valve of FIG. 1.

FIG. 4 illustrates a top plan view of some aspects of the portable electronic device and/or transducer assembly having a valve of FIG. 1. Representatively, FIG. 4 illustrates a top plan view of the yoke 112 and magnet assemblies 130A-B, with the remaining transducer components omitted. From this view, it can be seen that a number of ports 420A, 420B, 420C, 420D having valves 418A, 418B, 418C, 418D may be arranged around magnet assembly 130A. In particular, from this view it can be understood that ports 420A-D may be formed near each of the corners of magnet assembly 130A. Although four ports 420A-D are illustrated, it is contemplated that any number of ports suitable for providing minimum flow resistance and balanced pressure flow may be used. Valves 418A-D may be positioned at each of ports 420A-D so that they can be used to open or close ports 420A-D. Representatively, in some aspects, valves 418A-D may include flaps or other moving members that are attached to yoke 112 and operable to move between open and closed positions to open and close port ports 420A-D. Valves 418A-D may be actuated independently of one another by applying a separate voltage or signal to each valve. In this aspect, one or more of valves 418A-D may be closed while one or more of valves 418A-D may be open. In other aspects, valves 418A-D may be actuated simultaneously by a same voltage or signal such that they open or close all of ports 420A-D at a same time. In addition, in some aspects, it is contemplated that although not shown, similar to the previously discussed configurations, valves 418A-D may include a micro hole, pore or opening such that even when valves 418A-D are in the closed position and covering ports 420A-D, a small amount of leak through ports 420A-D is possible. In addition, although not shown, one or more of a vent similar to the previously discussed vent 122 may be formed through a portion of yoke 112 along near a side of magnet assembly 130A. The vent, however, may be optional. In addition, it is contemplated that although ports 420A-D and valves 418A-D are shown in this configuration near corners of magnet assembly 130A, they may be formed within other portions of yoke 112 surrounding magnet assembly 130A. In addition, although magnet assembly 130B corresponding to a second transducer 110B is also shown in FIG. 4, the second transducer 110B may be omitted as previously discussed and magnet assembly 130B also omitted from FIG. 4.

Figure 5:
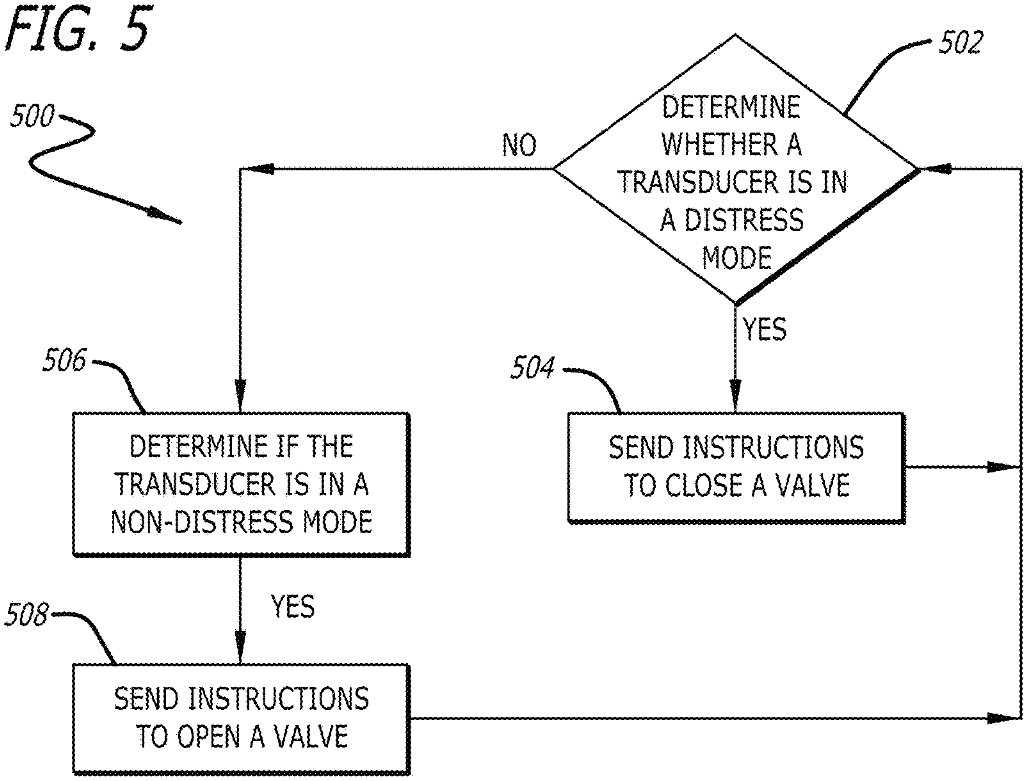
FIG. 5 illustrates a block diagram of one representative process for operating the portable electronic device and/or transducer assembly having a valve of FIG. 1 or FIG. 2.

FIG. 5 illustrates a block diagram of one representative process for operating the portable electronic device and/or transducer assembly having a valve of FIG. 1 or FIG. 2. Representatively, process 500 includes an initial operation 502 of determining whether a transducer is in a distress mode. If the transducer is determined to be in a distress mode, instructions or a signal to close the valve associated with a port of the transducer are transmitted to the assembly and the valve is closed at operation 504. The valve may remain in the closed position as long as the transducer is determined to be in a distress mode. If, on the other hand, the transducers is not determined to be in a distress mode, the process continues to operation 506 in which it is determined whether the transducer is in a non-distress mode. If the transducer is in a non-distress mode, instructions or a signal to open the valve associated with the transducer port are sent to the assembly and the valve is opened at operation 508. Process 500 may continue through operation of the transducer assembly to close/open the valves depending on whether the transducer assembly is in a distress or non-distress mode.

As previously discussed, any one or more of the valve assemblies disclosed herein in reference to FIGS. 1-5 may be dynamically controlled by the application of a voltage to control the amount of leak between the chambers or volumes that they connect. For example, any one or more of the valve assemblies may be dynamically opened to connect a front volume chamber or a back volume chamber of a transducer to an ambient environment surrounding the chambers and/or device enclosure in which the transducer is implemented. In other aspects, any one or more of the valve assemblies may be dynamically opened to connect the front volume chamber to the back volume chamber of the transducer. It should further be understood that although the valve assemblies are described as opening/closing various chamber associated with transducers, they may be used to open/close or otherwise connect any chambers where dynamical control of a leak between the chambers or different volumes is desired.

Figure 6:
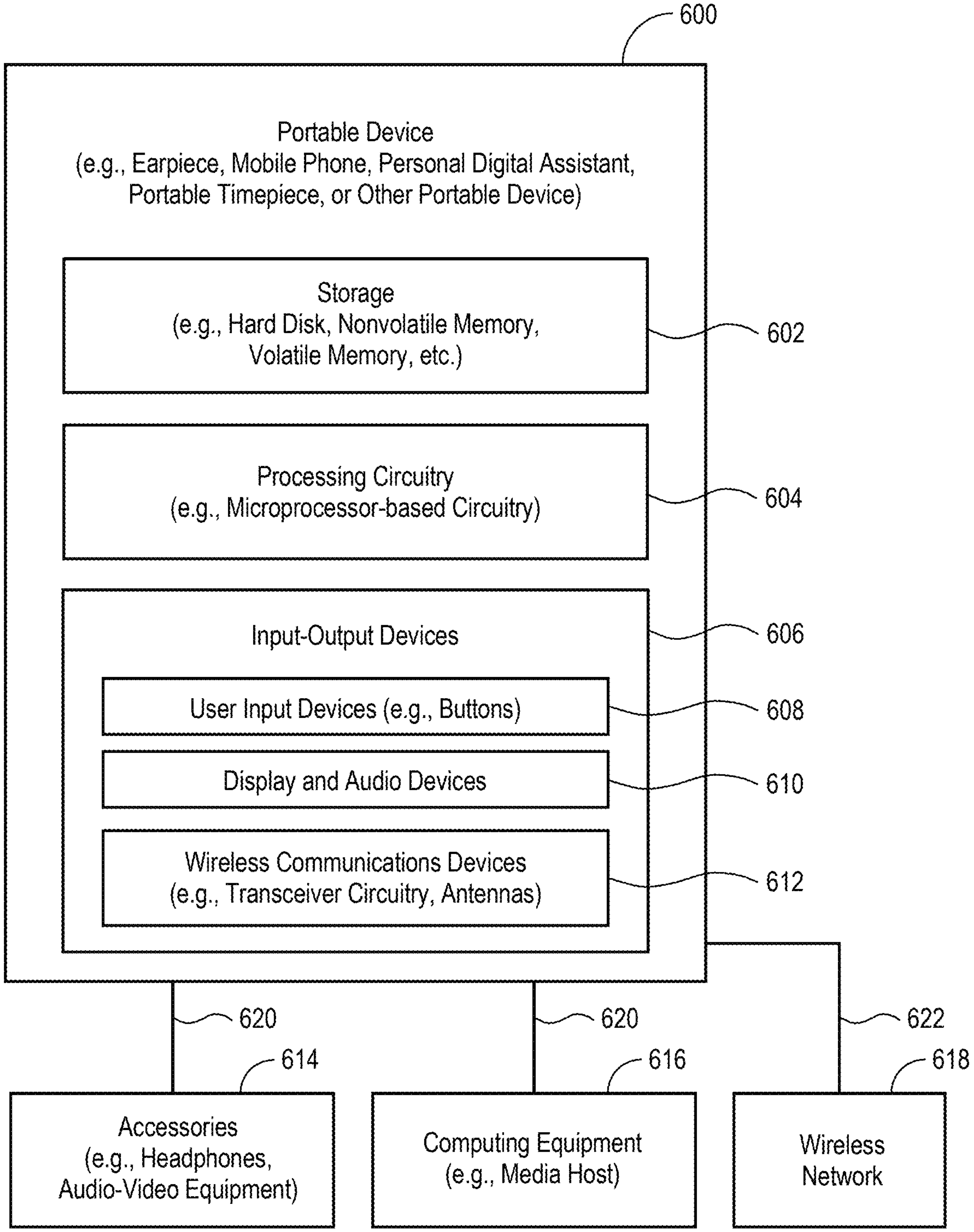
FIG. 6 illustrates a block diagram of one aspect of an electronic device within which a transducer assembly including a valve of FIG. 1-FIG. 5 may be implemented.

Referring now to FIG. 6, FIG. 6 illustrates a block diagram of one aspect of an electronic device within which the previously discussed transducer and/or valve assembly may be implemented. As shown in FIG. 6, device 600 may be any type of portable device within which a transducer and/or valve assembly disclosed herein may be desired, for example, an earpiece (e.g., in-ear earpiece, hearing aid or the like), mobile phone, personal digital assistant, portable timepiece or other portable device. Device 600 may include storage 602. Storage 602 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 604 may be used to control the operation of device 600. Processing circuitry 604 may be based on a processor such as a microprocessor and other suitable integrated circuits. With one suitable arrangement, processing circuitry 604 and storage 602 are used to run software on device 600, such as internet browsing applications, voice-over-internet-protocol (VOIP) telephone call applications, email applications, media playback applications, operating system functions, etc. Processing circuitry 604 and storage 602 may be used in implementing suitable communications protocols. Communications protocols that may be implemented using processing circuitry 604 and storage 602 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 604 may include power management circuitry to implement power management functions. For example, processing circuitry 604 may be used to adjust the gain settings of amplifiers (e.g., radio-frequency power amplifier circuitry) on device 600. Processing circuitry 604 may also be used to adjust the power supply voltages that are provided to portions of the circuitry on device 600. For example, higher direct-current (DC) power supply voltages may be supplied to active circuits and lower DC power supply voltages may be supplied to circuits that are less active or that are inactive. If desired, processing circuitry 604 may be used to implement a control scheme in which the power amplifier circuitry is adjusted to accommodate transmission power level requests received from a wireless network.

Input-output devices 606 may be used to allow data to be supplied to device 600 and to allow data to be provided from device 600 to external devices. Display screens, microphone acoustic ports, speaker acoustic ports, and docking ports are examples of input-output devices 606. For example, input-output devices 606 can include user input devices 608 such as buttons, touch screens, joysticks, click wheels, scrolling wheels, touch pads, key pads, keyboards, microphones, cameras, etc. A user can control the operation of device 600 by supplying commands through user input devices 608. Display and audio devices 610 may include liquid-crystal display (LCD) screens or other screens, light-emitting diodes (LEDs), and other components that present visual information and status data. Display and audio devices 610 may also include audio equipment such as speakers and other devices for creating sound. Display and audio devices 610 may contain audio-video interface equipment such as jacks and other connectors for external headphones and monitors.

Wireless communications devices 612 may include communications circuitry such as radiofrequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 6, device 600 can communicate with external devices such as accessories 614, computing equipment 616, and wireless network 618 as shown by paths 620 and 622. Paths 620 may include wired and wireless paths. Path 622 may be a wireless path. Accessories 614 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 616 may be any suitable computer. With one suitable arrangement, computing equipment 616 is a computer that has an associated wireless access point (router) or an internal or external wireless card that establishes a wireless connection with device 600. The computer may be a server (e.g., an internet server), a local area network computer with or without internet access, a user's own personal computer, a peer device (e.g., another portable electronic device), or any other suitable computing equipment.

Wireless network 618 may include any suitable network equipment, such as cellular telephone base stations, cellular towers, wireless data networks, computers associated with wireless networks, etc. For example, wireless network 618 may include network management equipment that monitors the wireless signal strength of the wireless handsets (cellular telephones, handheld computing devices, etc.) that are in communication with network 618.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. For example, although a speaker is specifically disclosed herein, the valve disclosed herein could be used with other types of transducers, for example, microphones. Still further, although a portable electronic device such as a mobile communications device is described herein, any of the previously discussed valve and transducer configurations may be implemented within a tablet computer, personal computer, laptop computer, notebook computer, headphones and the like. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A transducer assembly comprising:

an enclosure having an enclosure wall that defines a sound output port from an interior chamber of the enclosure;

a sound radiating surface having a voice coil coupled thereto and dividing the interior chamber into a front volume chamber coupling a first side of the sound radiating surface to the sound output port and a back volume chamber coupled to a second side of the sound radiating surface;

a magnet assembly having a magnet coupled to a yoke that defines in part the back volume chamber and an acoustic port from the back volume chamber; and a valve coupled to the acoustic port to close or open the acoustic port depending on whether the transducer assembly is in a distress mode or a non-distress mode.

2. The transducer assembly of claim 1 wherein the acoustic port is from the back volume chamber to an exterior chamber surrounding the enclosure.

3. The transducer assembly of claim 1 wherein the valve closes the acoustic port in the distress mode.

4. The transducer assembly of claim 3 wherein in the distress mode the sound radiating surface outputs a sound within a frequency range of from 2.5 kilohertz to 5 kilohertz.

5. The transducer assembly of claim 1 wherein the valve opens the acoustic port in the non-distress mode.

6. The transducer assembly of claim 5 wherein in the non-distress mode the sound radiating surface outputs a sound within a broadband frequency range of from 100 hertz to 10 kilohertz.

7. The transducer assembly of claim 1 wherein the yoke further defines a passive pressure equalization port from the back volume chamber.

8. The transducer assembly of claim 1 wherein the acoustic port is a first acoustic port and the valve is a first valve, and the transducer assembly further comprises a second acoustic port and a second valve coupled to the second acoustic port to close or open the second acoustic port depending on whether the transducer assembly is in the distress mode or the non-distress mode.

9. The transducer assembly of claim 1 wherein the valve comprises a micro leak that opens the back volume chamber to an exterior chamber surrounding the enclosure when the valve closes the acoustic port.

10. The transducer assembly of claim 1 wherein the sound radiating surface, the voice coil and the magnet comprise a first sound radiating surface, a first voice coil and a first magnet, and the transducer assembly further comprises a second sound radiating surface, a second voice coil and a second magnet, and the first sound radiating surface produces sound in the non-distress mode and the second sound radiating surface produces sound in the distress mode.

11. The transducer assembly of claim 1 wherein the transducer assembly is a speaker.

12. A portable electronic device comprising:

an enclosure having an enclosure wall that forms an interior chamber and a sound output port to an ambient environment;

a transducer assembly positioned within the interior chamber and dividing the interior chamber into a front volume chamber coupling a sound output side of the transducer assembly to the sound output port and a back volume chamber coupling another side of the transducer assembly to an acoustic port from the back volume chamber; and a valve coupled to the acoustic port, and wherein the valve is operable to close the acoustic port when the transducer assembly is in a distress mode, and open the acoustic port when the transducer assembly is in a non-distress mode.

13. The portable electronic device of claim 12 wherein the acoustic port is from the back volume chamber to a portion of the interior chamber surrounding the transducer assembly.

14. The portable electronic device of claim 12 wherein in the distress mode the transducer assembly outputs a sound within a broadband frequency range of from 2.5 kilohertz to 3.5 kilohertz, and in the non-distress mode the transducer assembly outputs a sound within a frequency range of from 100 hertz to 10 kilohertz.

15. The portable electronic device of claim 12 wherein the transducer assembly comprises a diaphragm having a voice coil and a magnet assembly coupled to a yoke, the acoustic port is formed through the yoke, and the yoke further defines a passive pressure equalization port from the back volume chamber.

16. The portable electronic device of claim 12 wherein the acoustic port is a first acoustic port and the valve is a first valve, and the transducer assembly further comprises a second acoustic port and a second valve coupled to the second acoustic port to close or open the second acoustic port depending on whether the transducer assembly is in the distress mode or the non-distress mode.

17. The portable electronic device of claim 12 wherein the valve comprises a micro leak that opens the back volume chamber to a portion of the interior chamber surrounding the transducer assembly when the valve closes the acoustic port.

18. The portable electronic device of claim 12 wherein the transducer assembly comprises a sound radiating surface having a voice coil coupled thereto and the sound output side of the sound radiating surface is coupled to the sound output port and the another side of the sound radiating surface is coupled to the back volume chamber, and a magnet assembly having a magnet coupled to a yoke that defines in part the back volume chamber and the acoustic port from the back volume chamber.

19. The portable electronic device of claim 12 wherein the transducer assembly is a first transducer assembly, and the portable electronic device further comprises a second transducer assembly, and the first transducer assembly produces sound in the non-distress mode and the second transducer assembly produces sound in the distress mode.

* * * * *